(12) United States Patent
Yang et al.

(10) Patent No.: US 12,513,330 B2
(45) Date of Patent: Dec. 30, 2025

(54) POINT CLOUD ENCODING AND DECODING METHOD AND DEVICE BASED ON TWO-DIMENSIONAL REGULARIZATION PLANE PROJECTION

(71) Applicant: Honor Device Co., Ltd., Shenzhen (CN)

(72) Inventors: Fuzheng Yang, Shenzhen (CN); Wei Zhang, Shenzhen (CN); Youguang Yu, Shenzhen (CN); Yuxin Du, Shenzhen (CN); Zexing Sun, Shenzhen (CN); Tian Chen, Shenzhen (CN); Ke Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 337 days.

(21) Appl. No.: 18/032,414

(22) PCT Filed: Feb. 7, 2022

(86) PCT No.: PCT/CN2022/075409
§ 371 (c)(1),
(2) Date: Apr. 18, 2023

(87) PCT Pub. No.: WO2022/166967
PCT Pub. Date: Aug. 11, 2022

(65) Prior Publication Data
US 2023/0396800 A1    Dec. 7, 2023

(30) Foreign Application Priority Data
Feb. 8, 2021   (CN) .......................... 202110171905.5

(51) Int. Cl.
*H04N 19/597*   (2014.01)
*G06T 9/00*      (2006.01)
(Continued)

(52) U.S. Cl.
CPC ........... *H04N 19/597* (2014.11); *G06T 9/001* (2013.01); *G06T 9/004* (2013.01); *H04N 19/129* (2014.11);
(Continued)

(58) Field of Classification Search
None
See application file for complete search history.

(56) References Cited

U.S. PATENT DOCUMENTS 11,756,234 B2 *   9/2023   Ricard .................... G06T 9/001
                                                                382/232
11,838,547 B2 * 12/2023   Guede .................. H04N 19/103
(Continued)

FOREIGN PATENT DOCUMENTS

| CN | 110708529 A | 1/2020 |
| EP | 3614672 A1  | 2/2020 |
| WO | 2020187140 A1 | 9/2020 |

OTHER PUBLICATIONS

Yu, Youguang, et al. "A regularized projection-based geometry compression scheme for LiDAR point cloud." IEEE Transactions on Circuits and Systems for Video Technology 33.3, pp. 1427-1437. (Year: 2022).*
(Continued)

*Primary Examiner* — Scott A Rogers
(74) *Attorney, Agent, or Firm* — Leydig, Voit & Mayer, Ltd.

(57) ABSTRACT

Disclosed are a point cloud encoding and decoding method and device based on a two-dimensional regularization plane projection. The encoding method includes: acquiring original point cloud data; performing two-dimensional regularization plane projection on the original point cloud data to obtain a two-dimensional projection plane structure; obtaining a plurality of pieces of two-dimensional image information according to the two-dimensional projection plane
(Continued)

structure; and encoding the plurality of pieces of two-dimensional image information to obtain code stream information. According to the present disclosure, the strong correlation representation of a point cloud on the two-dimensional projection plane structure is obtained, so that the spatial correlation of the point cloud is better reflected, and the encoding efficiency of the point cloud is improved. Moreover, a placeholder information map is used for assisting in encoding the depth information map, so that the encoding efficiency is further improved.

20 Claims, 6 Drawing Sheets

(51) Int. Cl.
  *H04N 19/129* (2014.01)
  *H04N 19/136* (2014.01)
  *H04N 19/159* (2014.01)
  *H04N 19/182* (2014.01)

(52) U.S. Cl.
  CPC ......... *H04N 19/136* (2014.11); *H04N 19/159* (2014.11); *H04N 19/182* (2014.11)

(56) References Cited

U.S. PATENT DOCUMENTS

| | | | |
|---|---|---|---|
| 11,949,889 B2* | 4/2024 | Chevet | H04N 19/33 |
| 12,230,000 B2* | 2/2025 | Chevet | G06T 9/00 |
| 12,256,099 B2* | 3/2025 | Yang | H04N 19/54 |
| 2003/0198290 A1* | 10/2003 | Millin | H04N 19/597 |
| | | | 375/240.01 |
| 2020/0296401 A1 | 9/2020 | Lee et al. | |
| 2020/0402246 A1 | 12/2020 | Hekmatian et al. | |
| 2021/0006806 A1 | 1/2021 | Schwarz et al. | |
| 2023/0290007 A1* | 9/2023 | Yang | G06T 9/00 |
| 2024/0013444 A1* | 1/2024 | Yang | G06T 9/004 |
| 2024/0062429 A1* | 2/2024 | Yang | G06T 9/001 |
| 2024/0080497 A1* | 3/2024 | Yang | H04N 19/50 |
| 2024/0112300 A1* | 4/2024 | Zhang | G01S 17/89 |
| 2024/0119636 A1* | 4/2024 | Yang | G06T 9/004 |
| 2024/0298039 A1* | 9/2024 | Yang | H04N 19/103 |

OTHER PUBLICATIONS

He et al., "Best-Effort Projection Based Attribute Compression for 3D Point Cloud," 2017 23rd Asia-Pacific Conference on Communications (APCC), pp. 1-6, Perth, WA, Australia (2017).

* cited by examiner

POINT CLOUD ENCODING AND DECODING METHOD AND DEVICE BASED ON TWO-DIMENSIONAL REGULARIZATION PLANE PROJECTION

CROSS-REFERENCE TO RELATED APPLICATIONS

This application is a national stage of International Application No. PCT/CN2022/075409, filed on Feb. 7, 2022, which claims priority to Chinese Patent Application No. 202110171905.5, filed on Feb. 8, 2021. The disclosures of both of the aforementioned applications are hereby incorporated by reference in their entireties.

TECHNICAL FIELD

The present disclosure relates to technical field of encoding and decoding, and specifically, to a point cloud encoding and decoding method and device based on a two-dimensional regularization plane projection.

BACKGROUND

With the improvement of hardware processing capabilities and the rapid development of computer vision, the three-dimensional point cloud has become a new generation of immersive multimedia after audio, image, and video, and is widely applied to virtual reality, augmented reality, automated driving, environmental modeling, and the like. However, the three-dimensional point cloud usually has a relatively large amount of data, which is not conducive to the transmission and storage of point cloud data. Therefore, it is of great significance to study an efficient point cloud encoding and decoding technology.

In the existing geometry-based point cloud compression (G-PCC) encoding framework, the geometry information and attribute information of the point cloud are encoded separately. At present, the G-PCC geometric encoding and decoding may be divided into octree-based geometric encoding and decoding and prediction tree-based geometric encoding and decoding.

Octree-based geometric encoding and decoding: At an encoder side, firstly, the geometry information of the point cloud is preprocessed, which includes the coordinate conversion and voxelization process of the point cloud. Subsequently, tree division (octree/quadtree/binary tree) is continuously performed on a bounding box in which the point cloud is located in the order of breadth-first traversal. Finally, the placeholder code of each node is encoded, and the quantity of points included in each leaf node is encoded, to generate a binary code stream. At a decoder side, firstly, the placeholder code of each node is continuously obtained by parsing in the order of breadth-first traversal. Subsequently, tree division is continuously performed in sequence, and the division stops until a unit cube of 1×1×1 is obtained through division. Finally, the quantity of points included in each leaf node is obtained by parsing, and finally reconstructed point cloud geometry information is obtained.

Prediction tree-based geometric encoding and decoding: At the encoder side, firstly, an inputted point cloud is sorted. Subsequently, a prediction tree structure is established. By classifying each point to a laser scanner to which the point belongs, the prediction tree structure is established according to different laser scanners. Subsequently, each node in the prediction tree is traversed, geometry information of the nodes is predicted by selecting different prediction modes to obtain predicted residuals, the predicted residuals are quantized by using a quantization parameter. Finally, the prediction tree structure, the quantization parameter, the predicted residuals of the geometry information of the nodes, and the like are encoded to generate a binary code stream. At the decoder side, firstly, the code stream is analyzed; then the prediction tree structure is reconstructed; subsequently the predicted residuals are dequantized based on the predicted residual of the geometry information of each node obtained by parsing and the quantization parameter; and finally reconstructed geometry information of each node is restored. That is, reconstruction of point cloud geometry information is completed.

However, due to relatively strong spatial sparsity of the point cloud, for the point cloud encoding technology using an octree structure, this structure will lead to a relatively large proportion of empty nodes obtained by division, and the spatial correlation of the point cloud cannot be fully reflected, which is not conducive to point cloud prediction and entropy encoding. In the prediction tree-based point cloud encoding and decoding technology, some parameters of the lidar device are used to establish a tree structure, and the tree structure is used for predictive encoding based on this. However, the tree structure does not fully reflect the spatial correlation of the point cloud, which is not conducive to point cloud prediction and entropy encoding. Therefore, both of the foregoing two point cloud encoding and decoding technologies have the problem of insufficiently high encoding efficiency.

SUMMARY

To resolve the foregoing problem in the existing technologies, the present disclosure provides a point cloud encoding and decoding method and device based on a two-dimensional regularization plane projection. The technical problem to be resolved in the present disclosure is implemented by the following technical solutions:

A point cloud encoding method based on a two-dimensional regularization plane projection is provided, including:
  acquiring original point cloud data;
  performing two-dimensional regularization plane projection on the original point cloud data to obtain a two-dimensional projection plane structure;
  obtaining a plurality of pieces of two-dimensional image information according to the two-dimensional projection plane structure; and
  encoding the plurality of pieces of two-dimensional image information to obtain code stream information.

In an embodiment of the present disclosure, the plurality of pieces of two-dimensional image information include a depth information map.

In an embodiment of the present disclosure, the encoding the plurality of pieces of two-dimensional image information to obtain code stream information includes:
  encoding the depth information map to obtain a depth information code stream.

In an embodiment of the present disclosure, the encoding the depth information map to obtain a depth information code stream includes:
  performing prediction on a pixel in the depth information map based on a placeholder information map to obtain a predicted residual; or
  performing prediction on a pixel in the depth information map based on reconstructed depth information of encoded pixels to obtain a predicted residual; and encoding the predicted residual to obtain the depth information code stream.

In an embodiment of the present disclosure, before the encoding the depth information map, the method further includes:

traversing the depth information map in a preset order, and performing, in a case that a current pixel is an empty pixel, depth information filling on the empty pixel.

In an embodiment of the present disclosure, the performing prediction on a pixel in the depth information map based on a placeholder information map to obtain a predicted residual includes:

traversing pixels in the depth information map in a specific scanning order; and determining whether a current pixel is non-empty according to the placeholder information map, and predicting depth information of a current non-empty pixel by using the reconstructed depth information of encoded non-empty pixels, to obtain the predicted residual.

Another embodiment of the present disclosure further provides a point cloud encoding device based on a two-dimensional regularization plane projection, including:

a first data acquisition module, configured to acquire original point cloud data;

a projection module, configured to perform two-dimensional regularization plane projection on the original point cloud data to obtain a two-dimensional projection plane structure;

a data processing module, configured to obtain a plurality of pieces of two-dimensional image information according to the two-dimensional projection plane structure; and an encoding module, configured to encode the plurality of pieces of two-dimensional image information to obtain code stream information.

Still another embodiment of the present disclosure further provides a point cloud decoding method based on a two-dimensional regularization plane projection, including:

acquiring code stream information and decoding the code stream information to obtain parsed data;

reconstructing a plurality of pieces of two-dimensional image information according to the parsed data;

obtaining a two-dimensional projection plane structure according to the plurality of pieces of two-dimensional image information; and reconstructing a point cloud by using the two-dimensional projection plane structure.

In an embodiment of the present disclosure, the reconstructing a plurality of pieces of two-dimensional image information according to the parsed data includes:

reconstructing, according to predicted residuals of a depth information map in the parsed data, the depth information map to obtain a reconstructed depth information map.

Still another embodiment of the present disclosure further provides a point cloud decoding device based on a two-dimensional regularization plane projection, including:

a second data acquisition module, configured to acquire code stream information and decode the code stream information to obtain parsed data;

a first reconstruction module, configured to reconstruct a plurality of pieces of two-dimensional image information according to the parsed data;

a second reconstruction module, configured to obtain a two-dimensional projection plane structure according to the plurality of pieces of two-dimensional image information; and a point cloud reconstruction module, configured to reconstruct a point cloud by using the two-dimensional projection plane structure.

Beneficial Effects of the Present Disclosure are as Follows

1. According to the present disclosure, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when a plurality of pieces of two-dimensional image information obtained for the two-dimensional regularization projection plane structure are encoded subsequently, the spatial correlation of the point cloud can be greatly utilized, and the spatial redundancy is reduced, thereby further improving the encoding efficiency of the point cloud.

2. According to the present disclosure, a placeholder information map is used for assisting in encoding the depth information map, so that the encoding efficiency is improved.

3. According to the present disclosure, a depth information map may further be used for assisting in encoding other two-dimensional maps, to improve the encoding efficiency.

The following further describes the present disclosure in detail with reference to the accompanying drawings and the embodiments.

DESCRIPTION OF EMBODIMENTS

The present disclosure is further described in detail below with reference to specific embodiments, but the implementations of the present disclosure are not limited thereto.

Embodiment 1

Figure 1:
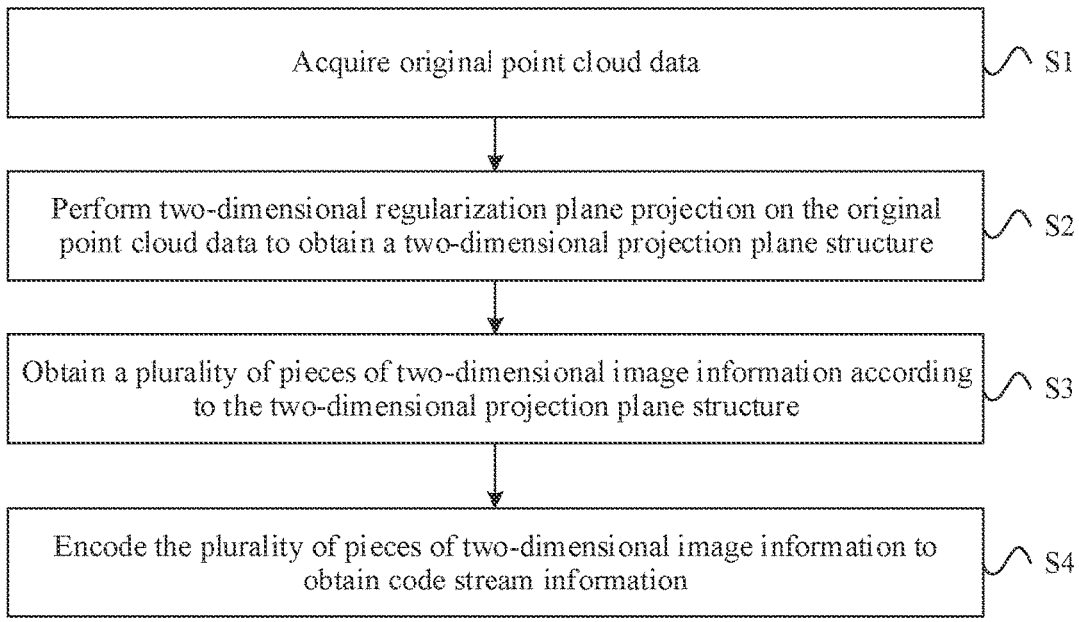
FIG. 1 is a schematic diagram of a point cloud encoding method based on a two-dimensional regularization plane projection according to an embodiment of the present disclosure.

FIG. 1 is a schematic diagram of a point cloud encoding method based on a two-dimensional regularization plane projection according to an embodiment of the present disclosure, which includes:

S1: Acquire original point cloud data.

Specifically, the original point cloud data usually includes a group of three-dimensional space points, and each space point records its geometric position information and additional attribute information such as color, reflectivity, and normal. The geometric position information of the point cloud is generally expressed based on a Cartesian coordinate system, that is, expressed by using the coordinates x, y, and z of points. The original point cloud data may be acquired through 3D scanning devices such as a lidar, and may alternatively be acquired based on public datasets provided by various platforms. In this embodiment, it is assumed that the geometric position information of the acquired original point cloud data is expressed based on the Cartesian coordinate system. It should be noted that the representation method of the geometric position information of the original point cloud data is not limited to Cartesian coordinates.

S2: Perform two-dimensional regularization plane projection on the original point cloud data to obtain a two-dimensional projection plane structure.

Specifically, in this embodiment, before two-dimensional regularization plane projection is performed on the original point cloud, preprocessing such as voxelization processing may further be performed on the original point cloud data, to facilitate subsequent encoding.

First, the two-dimensional projection plane structure is initialized.

Initialization of the two-dimensional regularization projection plane structure of the point cloud requires the use of regularization parameters. The regularization parameters are usually finely measured by the manufacturer and provided to consumers as one of the necessary data, such as an acquisition range of a lidar, a sampling angular resolution $\Delta\varphi$ or the quantity of sampling points of the horizontal azimuth angle, a distance correction factor of each laser scanner, offset information $V_o$ and $H_o$ of the laser scanner in the vertical direction and the horizontal direction, and offset information $\theta_0$ and $\alpha$ of the laser scanner along the pitch angle and the horizontal azimuth angle.

It should be noted that the regularization parameters are not limited to the parameters given above. Given calibration parameters of the lidar may be used as the regularization parameters, or the regularization parameters may be obtained in manners such as optimizing estimation and data fitting in a case that the calibration parameters of the lidar are not given.

The two-dimensional regularization projection plane structure of the point cloud is a data structure including M rows and N columns of pixels, and points in the three-dimensional point cloud correspond to the pixels in the data structure after projection. In addition, a pixel (i, j) in the data structure may be associated with a cylindrical coordinate component $(\theta, \phi)$. For example, the pixel (i, j) corresponding to a cylindrical coordinate $(r, \theta, \phi)$ may be found by using the following formula:

$$i = \min_{1,2\ldots LaserNum} |\theta - \theta_0|;$$

$$j = (\phi + 180°)/\Delta\varphi.$$

Figure 2:
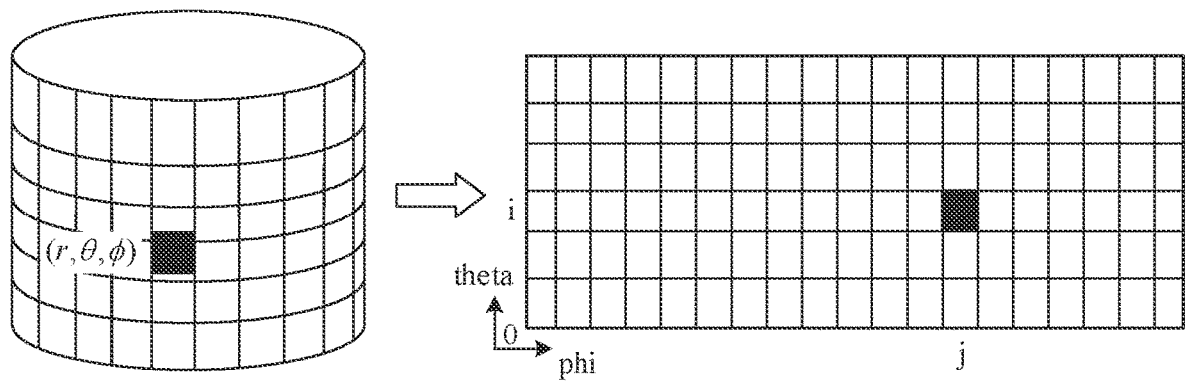
FIG. 2 is a schematic diagram of a correspondence between cylindrical coordinates of points and pixels in a two-dimensional projection plane according to an embodiment of the present disclosure.

Specifically, FIG. 2 is a schematic diagram of a correspondence between cylindrical coordinates of points and pixels in a two-dimensional projection plane according to an embodiment of the present disclosure.

It should be noted that the correspondence of pixels herein is not limited to cylindrical coordinates.

Further, the resolution of the two-dimensional regularization projection plane may be obtained by using the regularization parameters. For example, it is assumed that the resolution of the two-dimensional regularization projection plane is M×N, then the quantity of laser scanners in the regularization parameters may be used to initialize M, and the sampling angle resolution $\Delta\varphi$ of the horizontal azimuth angle (or the quantity of sampling points of the laser scanner) is used to initialize N. For example, the following formula may be used, and finally the initialization of the two-dimensional projection plane structure can be completed, to obtain a plane structure including M×N pixels:

$$M = \text{laser}Num;$$

$$N = \frac{360°}{\Delta\varphi} \text{ or } N = \text{point } Num \text{ Per Laser}.$$

In addition, a mapping relationship between the original point cloud data and the two-dimensional projection plane structure is determined, so as to project the original point cloud data onto the two-dimensional projection plane structure.

In this part, by determining the position of the original point cloud in the two-dimensional projection plane structure point by point, and the point cloud originally distributed disorderly in the Cartesian coordinate system is mapped onto the evenly distributed two-dimensional regularization projection plane structure. Specifically, for each point in the original point cloud, a corresponding pixel is determined in the two-dimensional projection plane structure. For example, a pixel with the shortest spatial distance from a projection position of the point in the two-dimensional plane may be selected as the corresponding pixel of the point.

If a cylindrical coordinate system is used for two-dimensional projection, the specific process of determining pixels corresponding to the original point cloud is as follows:

a. A cylindrical coordinate component r of a current point in the original point cloud data is determined, and specifically, the following formula is used for calculation:

$$r=\sqrt{x^2+y^2}.$$

b. A search region of the current point in the two-dimensional projection plane structure is determined. Specifically, the entire two-dimensional projection plane structure may be directly selected as the search region. Further, to reduce the amount of calculation, the pitch angle θ and azimuth angle ϕ of the cylindrical coordinate component of the current point may further be used to determine the search region of the corresponding pixel in the two-dimensional projection plane structure, to reduce the search region.

c. After the search region is determined, for each pixel (i, j) in the search region, the regularization parameters, that is, the calibration parameters $\theta_0$, $V_o$, $H_o$, and $\alpha$ of the $i_{th}$ laser scanner of the lidar, are used to calculate the position (xl, yl, zl) of the current pixel in the Cartesian coordinate system, where the specific calculation formula is as follows:

$\theta_i = \theta_0$ $\phi_j = -180° + j \times \Delta\phi$ $xl = r \cdot \sin(\phi_j - \alpha) - H_o \cdot \cos(\phi_j - \alpha)$ $yl = r \cdot \cos(\phi_j - \alpha) + H_o \cdot \sin(\phi_j - \alpha)$ $zl = r \cdot \tan \theta_i + V_o$ d. After the position (xl, yl, zl) of the current pixel in the Cartesian coordinate system is obtained, a spatial distance between the position and the current point (x, y, z) is calculated and used as an error Err, that is:

$\text{Err} = \text{dist}\{(x,y,z),(xl,yl,zl)\}$

If the error Err is less than a current minimum error minErr, the error Err is used to update the minimum error minErr, and i and j corresponding to the current pixel are used to update i and j of the pixel corresponding to the current point; and if the error Err is greater than the minimum error minErr, the foregoing update process will not be performed.

e. After all the pixels in the search region have been traversed, the corresponding pixel (i, j) of the current point in the two-dimensional projection plane structure can be determined.

Figure 3:
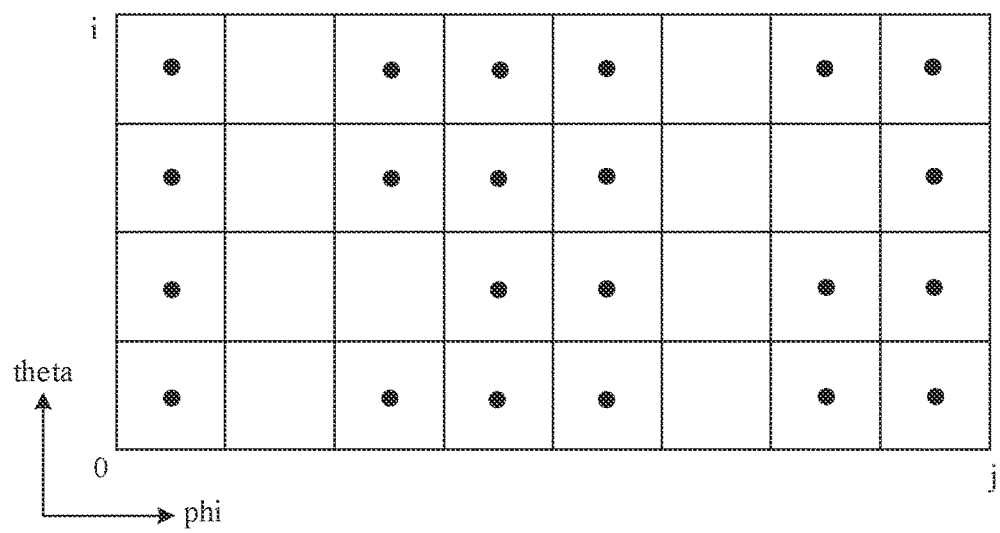
FIG. 3 is a schematic diagram of a two-dimensional projection plane structure of a point cloud according to an embodiment of the present disclosure.

When the foregoing operations have been completed for all the points in the original point cloud, the two-dimensional regularization plane projection of the point cloud is completed. Specifically, FIG. 3 is a schematic diagram of a two-dimensional projection plane structure of a point cloud according to an embodiment of the present disclosure. Each point in the original point cloud data is mapped to a corresponding pixel in the structure.

It should be noted that during the two-dimensional regularization plane projection of the point cloud, a plurality of points in the point cloud may correspond to the same pixel in the two-dimensional projection plane structure. To avoid this situation, these space points may be chosen to be projected to different pixels during projection. For example, during projection of a certain point, if the pixel corresponding to the point already has a corresponding point, the point is projected to an empty pixel adjacent to the pixel. In addition, if a plurality of points in the point cloud have been projected to the same pixel in the two-dimensional projection plane structure, during encoding based on the two-dimensional projection plane structure, the quantity of corresponding points in each pixel should be additionally encoded, and information of each corresponding point in the pixel is encoded according to the quantity of points.

S3: Obtain a plurality of pieces of two-dimensional image information according to the two-dimensional projection plane structure.

In this embodiment, the plurality of pieces of two-dimensional image information include a depth information map.

Specifically, the depth information map is used to represent a distance between a corresponding point of each occupied pixel in the two-dimensional regularization projection plane structure and a coordinate origin. For example, the cylindrical coordinate component r of the point corresponding to the pixel may be used as a depth of the pixel. It is assumed that the Cartesian coordinate of the point corresponding to the pixel is (x, y, z) then the cylindrical coordinate component r of the point, that is, the depth of the pixel, may be obtained by using the formula $r = \sqrt{x^2 + y^2}$. Based on this, each occupied pixel in the two-dimensional regularization projection plane structure has a depth value, so that a corresponding depth information map is obtained.

S4: Encode the plurality of pieces of two-dimensional image information to obtain code stream information.

Correspondingly, the encoding the plurality of pieces of two-dimensional image information to obtain code stream information includes: encoding the depth information map to obtain a depth information code stream. Specifically, prediction first needs to be performed on the depth information map, to obtain a predicted residual of depth information, and then the predicted residual is encoded.

In this embodiment, prediction may be performed on a pixel in the depth information map by using a placeholder information map and reconstructed depth information of encoded pixels to obtain a predicted residual. Subsequently, the residual is encoded, to obtain a depth information code stream. The placeholder information map is used to identify whether each pixel in the two-dimensional regularization projection plane structure is occupied, that is, whether each pixel corresponds to a point in the point cloud. If each pixel is occupied, the pixel is referred to as being non-empty; otherwise, the pixel is referred to as being empty. For example, 0 and 1 may be used for representation, where 1 indicates that the current pixel is occupied; and 0 indicates that the current pixel is not occupied, which may be directly obtained based on the two-dimensional projection plane structure of the point cloud.

Figure 4:
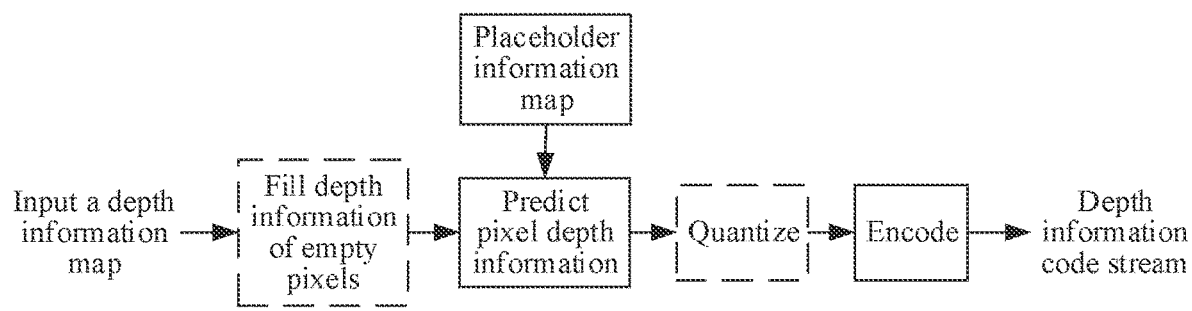
FIG. 4 is an encoding block diagram of a depth information map according to an embodiment of the present disclosure.

FIG. 4 is an encoding block diagram of a depth information map according to an embodiment of the present disclosure, which specifically includes:

41) Fill Depth Information of Empty Pixels

Further, because the empty pixels are not occupied, there is no point corresponding to this type of pixels in the point cloud, so that the pixels have no corresponding depth information. In this case, whether to fill depth information of the empty pixels may be selected. By adding depth information for the empty pixel, it will be more convenient to perform pixel depth information prediction or to convert and compress the depth information map by using video/image encoding and decoding methods.

Figure 5:
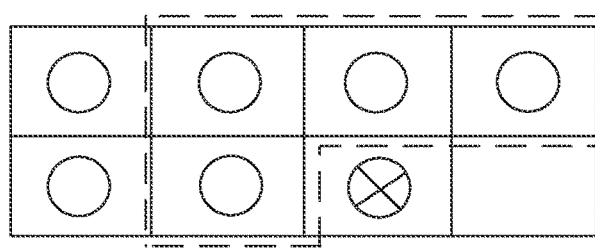
FIG. 5 is a schematic diagram of filling of depth information of empty pixels according to an embodiment of the present disclosure.

Specifically, the depth information map is traversed in a preset order, for example, a Z-shaped order. The placeholder information map is used to determine whether the current pixel is an empty pixel, and then depth information filling is performed on each empty pixel. During traversing to the current empty pixel, the pixels before the empty pixel already have depth information, so that linear fitting may be performed on the depth information of the pixels in the adjacent region of the current empty pixel by using the following formula, to obtain depth information of the current pixel, and the depth information is used as the depth information R_cur to be filled to the current empty pixel:

$$R\_cur = \sum_{i=1}^{N} R_i/N$$

where $R_i(i=1, 2 \ldots N)$ represents depth information of pixels in an adjacent region, and N is the quantity of pixels for reference in the adjacent region of the current pixel. Finally, after each pixel in the depth information map is traversed and processed, a filled depth information map is obtained. FIG. 5 is a schematic diagram of filling of depth information of empty pixels according to an embodiment of the present disclosure, where ⊗ represents the current empty pixel, and ○ represents the pixels that can be used for reference in the adjacent region of the current pixel.

42) Predict Pixel Depth Information

Before the depth information of pixels is encoded, the depth information of the current pixel needs to be predicted. The depth information of the current pixel may be predicted by using the placeholder information map and the reconstructed depth information of the encoded pixels.

The prediction method that can be used is, for example, averaging the depth information of the processed pixels in the adjacent region of the current pixel as a predicted value of the depth information of the current pixel.

Figure 6:
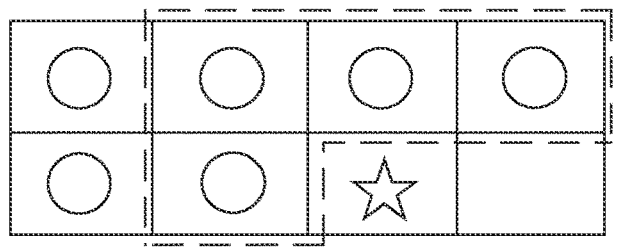
FIG. 6 is a schematic prediction diagram of depth information of pixels according to an embodiment of the present disclosure.

Specifically, the pixels in the depth information map may be traversed in a certain scanning order, for example, Z-shaped scanning. Subsequently, whether the current pixel is non-empty is determined according to the placeholder information map, and then the depth information of each non-empty pixel is predicted. FIG. 6 is a schematic prediction diagram of depth information of pixels according to an embodiment of the present disclosure, where ☆ represents the current non-empty pixel, and ○ represents the pixels that can be used for reference in the adjacent region of the current pixel.

During prediction on the depth information of the current pixel, a predicted value R_pred of the depth information of the current pixel may be obtained through interpolation by using the depth information of the pixels in the adjacent region of the current pixel, that is, the dashed box in FIG. 6. The calculation formula of the predicted value is as follows:

$$R\_pred = \sum_{i=1}^{M} R_i/M$$

where $R_i(i=1, 2 \ldots M)$ represents depth information of pixels in an adjacent region of the current pixel, and M is the quantity of pixels in the adjacent region. After the predicted value of the depth information of the current pixel is obtained, a difference between original depth information and predicted depth information of the current pixel is calculated, and a predicted residual of the depth information of the current pixel is obtained.

According to the present disclosure, during encoding of the depth information, a placeholder information map is used for assisting in prediction of the depth information map, thereby improving the encoding efficiency.

In another embodiment of the present disclosure, a conventional encoding method may alternatively be used to perform prediction on a pixel in the depth information map directly according to reconstructed depth information of encoded pixels to obtain a predicted residual.

In addition, an optimal prediction mode may alternatively be selected from a plurality of preset prediction modes through a rate-distortion optimization model to perform prediction on a pixel in the depth information map to obtain a predicted residual.

For example, six prediction modes may be set as follows:

Mode0: Direct mode, skip prediction and directly perform compression;

Mode1: To-the-left prediction, use a pixel on the left as a reference pixel;

Mode2: Upward prediction, use a pixel above as a reference pixel;

Mode3; Upper left prediction, use a pixel on the upper left as a reference pixel;

Mode4: Upper right prediction, use a pixel on the upper right as a reference pixel;

Mode5: Use pixels on the left, above, on the upper left, and on the upper right as reference pixels.

An optimal mode is selected for prediction through a rate-distortion model to obtain the predicted residual.

43) Encode the Predicted Residual to obtain The Depth Information Code Stream

After prediction of the depth information is completed, the predicted residual needs to be encoded. It should be noted that when lossy encoding is performed on the depth information map, the predicted residual of the depth information need to be quantized before encoding. When lossless encoding is performed on the depth information map, the predicted residual does not need to be quantized.

Figure 7:
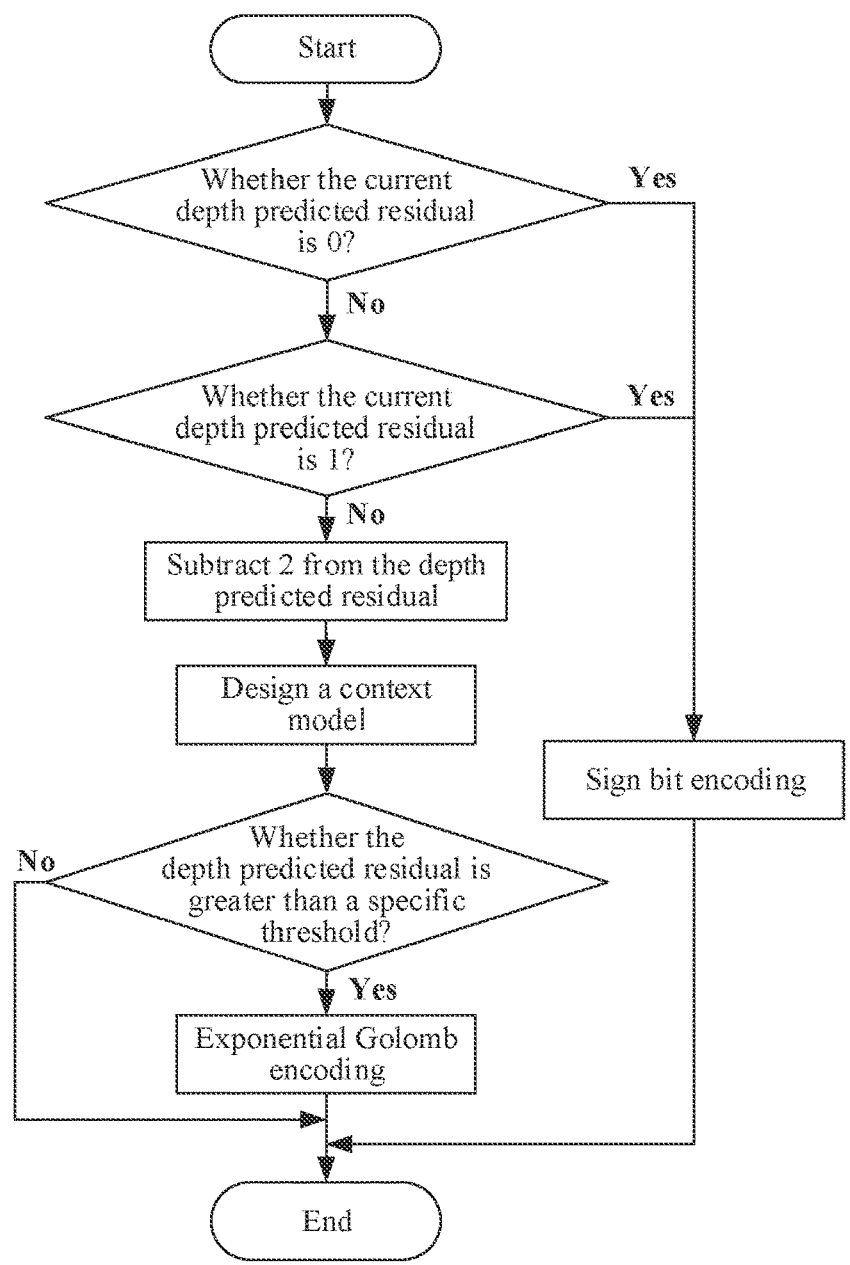
FIG. 7 is a flowchart of entropy encoding of a predicted residual of depth information according to an embodiment of the present disclosure.

Specifically, this embodiment is implemented in a context-based entropy encoding manner. For example, the entropy encoding process shown in FIG. 7 may be used to encode the predicted residual. The specific encoding process is as follows:

a. first determine whether the predicted residual of the depth information of the current pixel is 0, and if the predicted residual is 0, encode the 0 identifier, and skip performing subsequent encoding;

b. otherwise, determine whether the predicted residual of the depth information of the current pixel is 1, if the predicted residual is 1, encode the 1 identifier, and skip performing subsequent encoding;

c. otherwise, subtract 2 from the current predicted residual value, and then determine whether the predicted residual is greater than a specific threshold; and if the predicted residual is less than the specific threshold, design a context model for the current predicted residual; otherwise, perform encoding in the following manner:

designing context for predicted residual information of a part of which the predicted residual is less than the threshold for encoding; and performing exponential Golomb encoding on the predicted residual information of a part of which the predicted residual is greater than the threshold.

So far, encoding of the depth information map is completed.

In addition, in another embodiment of the present disclosure, if the depth information map is filled, the depth information map may alternatively be encoded through image/video compression. Encoding solutions that can be used herein include, but not limited to: JPEG, JPEG2000, HEIF, H.264\AVC, H.265\HEVC, and the like.

In another embodiment of the present disclosure, other information maps obtained according to the two-dimensional projection plane structure, such as a placeholder information map, a projection residual information map, a coordinate conversion error information map, and an attribute information map, may further be encoded to obtain corresponding code stream information.

According to the present disclosure, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when a depth information map and other two-dimensional image information obtained for the two-dimensional regularization projection plane structure are encoded subsequently, the spatial correlation of the point cloud can be greatly utilized, and the spatial redundancy is reduced, thereby further improving the encoding efficiency of the point cloud.

Embodiment 2

Figure 8:
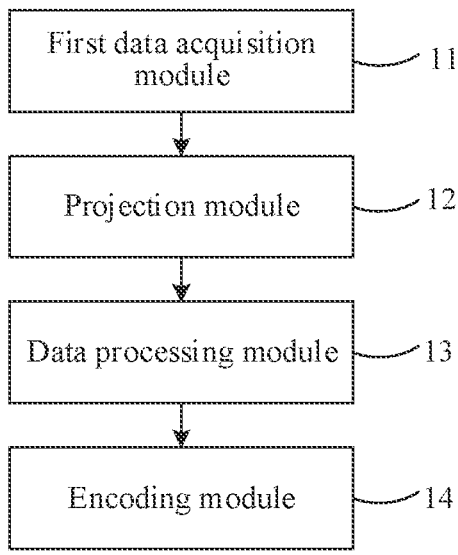
FIG. 8 is a schematic structural diagram of a point cloud encoding device based on a two-dimensional regularization plane projection according to an embodiment of the present disclosure.

Based on Embodiment 1, this embodiment provides a point cloud encoding device based on a two-dimensional regularization plane projection. FIG. 8 is a schematic structural diagram of a point cloud encoding device based on a two-dimensional regularization plane projection according to an embodiment of the present disclosure, which includes:
- a first data acquisition module 11, configured to acquire original point cloud data;
- a projection module 12, configured to perform two-dimensional regularization plane projection on the original point cloud data to obtain a two-dimensional projection plane structure;
- a data processing module 13, configured to obtain a plurality of pieces of two-dimensional image information according to the two-dimensional projection plane structure; and
- an encoding module 14, configured to encode the plurality of pieces of two-dimensional image information to obtain code stream information.

The encoding device provided in this embodiment can implement the encoding method described in Embodiment 1, and the detailed process is not described herein again. The various modules in FIG. 8 can be implemented as instructions stored in a memory and executed by a processor.

Embodiment 3

Figure 9:
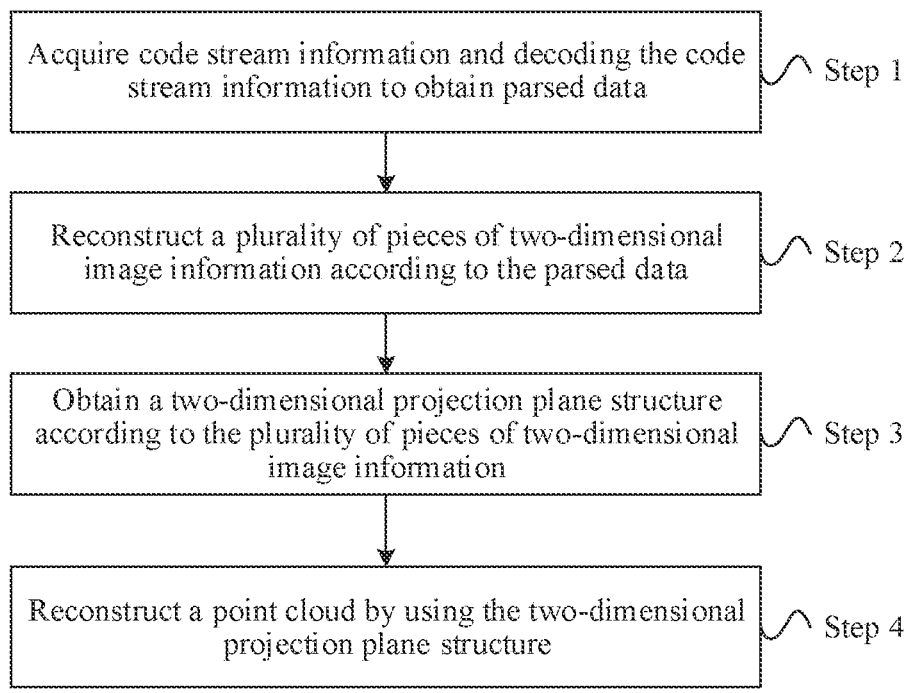
FIG. 9 is a schematic diagram of a point cloud decoding method based on a two-dimensional regularization plane projection according to an embodiment of the present disclosure.

FIG. 9 is a schematic diagram of a point cloud decoding method based on a two-dimensional regularization plane projection according to an embodiment of the present disclosure, the method includes:

Step 1: Acquire code stream information and decoding the code stream information to obtain parsed data.

A decoder side acquires compressed code stream information, and uses an existing entropy decoding technology corresponding to the technology used at an encoder side to perform corresponding decoding on the code stream information to obtain the parsed data.

The specific decoding process is as follows:
a. first parse whether the predicted residual of the depth information of the current pixel is 0, if the predicted residual is 0, the predicted residual of the current pixel is 0, and skip performing subsequent decoding;

b. otherwise, parse whether the predicted residual of the depth information of the current pixel is 1, if the predicted residual is 1, the predicted residual of the current pixel is 1, and skip performing subsequent decoding;

c. otherwise, design a corresponding context model for the current predicted residual for decoding, then determine whether the predicted residual obtained by parsing is greater than a specific threshold, and if the predicted residual is less than the specific threshold, skip performing subsequent decoding; otherwise, decode the predicted residual value of a part of which a predicted residual is greater than the threshold in an exponential Golomb decoding manner. Finally, 2 is added to the predicted residual value as the final predicted residual of the depth information obtained by parsing.

It should be noted that, if the encoder side quantizes the predicted residual of the depth information, the predicted residual obtained by parsing needs to be dequantized herein.

Step 2: Reconstruct a plurality of pieces of two-dimensional image information according to the parsed data.

In this embodiment, Step 2 may include the following steps:
reconstructing, according to predicted residuals of a depth information map in the parsed data, the depth information map to obtain a reconstructed depth information map.

Specifically, because at the encoder side, the plurality of pieces of two-dimensional image information may include a depth information map, that is, the depth information map is encoded, the code stream information at the decoder side correspondingly includes a depth information code stream. More specifically, the parsed data obtained by decoding the code stream information includes a predicted residual of the depth information.

Because in Embodiment 1, the encoder side traverses the pixels in the depth information map in a certain scanning order and encodes the depth information of non-empty pixels therein, predicted residuals of the pixel depth information obtained by the decoder side is also in this order, and the decoder side may obtain the resolution of the depth information map by using regularization parameters. For details, reference may be made to the part of initializing the two-dimensional projection plane structure in S2 in Embodiment 1. Therefore, the decoder side can know a position of a pixel currently to be reconstructed in the two-dimensional map according to the resolution of the depth information map and the placeholder information map.

Figure 10:
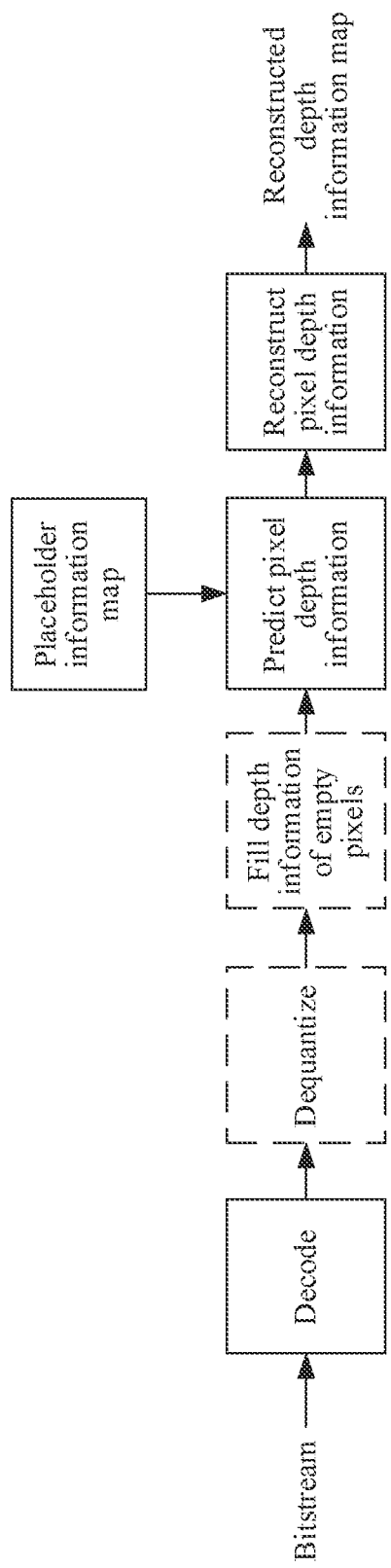
FIG. 10 is a decoding block diagram of a depth information map according to an embodiment of the present disclosure.

FIG. 10 is a decoding block diagram of a depth information map according to an embodiment of the present disclosure. If the encoder side fills depth information of empty pixels, the decoder side similarly uses the placeholder information map and the reconstructed depth information of encoded pixels to perform linear fitting and filling on the depth information of the current empty pixel. In addition, the depth information of the pixel currently to be reconstructed is predicted according to the placeholder information map and the reconstructed depth information of the encoded pixels, which is consistent with the prediction method on the encoder side. The predicted value of the depth information of the pixel currently to be reconstructed is obtained through interpolation by using the depth information of pixels in the adjacent region of the pixel currently to be reconstructed, and then the depth information of the current pixel is reconstructed according to the obtained predicted value and the parsed predicted residual. After the depth information of all pixels is reconstructed, a reconstructed depth information map is obtained.

Step 3: Obtain a two-dimensional projection plane structure according to the plurality of pieces of two-dimensional image information.

Because the resolution of the two-dimensional projection plane structure is consistent with that of the depth information map, and the depth information map has been reconstructed, the depth information of each non-empty pixel in the two-dimensional projection plane structure can be known, to obtain a reconstructed two-dimensional projection plane structure.

Step 4: Reconstruct a point cloud by using the two-dimensional projection plane structure.

By traversing the pixels in the reconstructed two-dimensional projection plane structure in a certain scanning order, the depth information of each non-empty pixel can be known. If the current pixel (i, j) is non-empty, and it is known that the depth information thereof is r, other information such as coordinate conversion error information is used to reconstruct a space point (x, y, z) corresponding to the pixel. Specifically, the corresponding position of the current pixel is (i, j) may be expressed as $(\phi_j, i)$, then the current pixel may be inversely projected back to the Cartesian coordinate system by using regularization parameters and the following formula, to obtain the corresponding Cartesian coordinate (xl, yl, zl).

$$\phi_j = -180° + j \times \Delta\phi$$

$$\theta_i = \theta_0$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

Subsequently, other information, for example, the coordinate conversion error information $(\Delta x, \Delta y, \Delta z)$, is used to reconstruct the space point (x, y, z) corresponding to the current pixel, that is, $(x, y, z) = (xl, yl, zl) + (\Delta x, \Delta y, \Delta z)$. Finally, a corresponding space point can be reconstructed for each non-empty pixel in the two-dimensional projection structure according to the foregoing calculation, to obtain the reconstructed point cloud.

Embodiment 4

Figure 11:
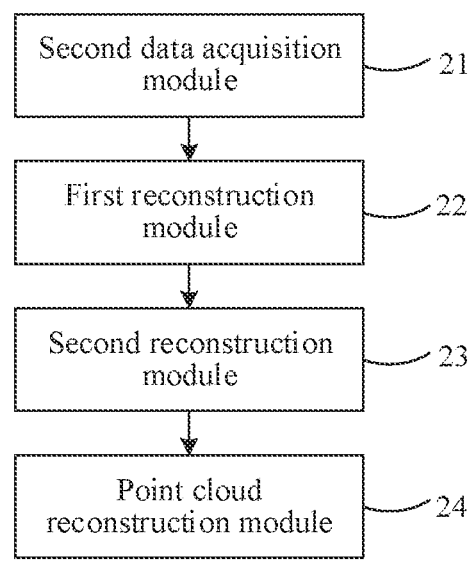
FIG. 11 is a schematic structural diagram of a point cloud decoding device based on a two-dimensional regularization plane projection according to an embodiment of the present disclosure.

Based on Embodiment 3, this embodiment provides a point cloud decoding device based on a two-dimensional regularization plane projection. FIG. 11 is a schematic structural diagram of a point cloud decoding device based on a two-dimensional regularization plane projection according to an embodiment of the present disclosure, which includes:

a second data acquisition module 21, configured to acquire code stream information and decode the code stream information to obtain parsed data;

a first reconstruction module 22, configured to reconstruct a plurality of pieces of two-dimensional image information according to the parsed data;

a second reconstruction module 23, configured to obtain a two-dimensional projection plane structure according to the plurality of pieces of two-dimensional image information; and a point cloud reconstruction module 24, configured to reconstruct a point cloud by using the two-dimensional projection plane structure.

The decoding device provided in this embodiment can implement the decoding method in Embodiment 3, and the detailed process is not described herein again. The various modules in FIG. 11 can be implemented as instructions stored in a memory and executed by a processor.

The foregoing contents are detailed descriptions of the present disclosure with reference to specific exemplary embodiments, and it should not be considered that the specific implementation of the present disclosure is limited to these descriptions. A person of ordinary skill in the art, to which the present disclosure belongs, may further make several simple deductions or replacements without departing from the concept of the present disclosure, and such deductions or replacements should all be considered as falling within the protection scope of the present disclosure.

What is claimed is:

1. A point cloud encoding method, the method comprising:

acquiring original point cloud data;

performing two-dimensional regularization plane projection on the original point cloud data to obtain a two-dimensional projection plane structure;

obtaining a plurality of pieces of two-dimensional image information according to the two-dimensional projection plane structure, wherein the plurality of pieces of two-dimensional image information comprise a depth information map, and wherein the depth information map represents a distance between a corresponding point of each occupied pixel in the two-dimensional projection plane structure and a coordinate origin; and encoding the plurality of pieces of two-dimensional image information to obtain code stream information.

2. The method according to claim 1, wherein the encoding the plurality of pieces of two-dimensional image information to obtain the code stream information comprises:

encoding the depth information map to obtain a depth information code stream.

3. The method according to claim 2, wherein the encoding the depth information map to obtain the depth information code stream comprises:

performing prediction on a pixel in the depth information map based on a placeholder information map to obtain a predicted residual; or performing prediction on a pixel in the depth information map based on reconstructed depth information of encoded pixels to obtain a predicted residual, and encoding the predicted residual to obtain the depth information code stream.

4. The method according to claim 3, wherein before the encoding the depth information map, the method further comprises:

traversing the depth information map in a preset order, and performing, in a case that a current pixel is an empty pixel, depth information filling on the empty pixel.

5. The method according to claim 3, wherein the performing prediction on the pixel in the depth information map based on the placeholder information map to obtain the predicted residual comprises:

traversing pixels in the depth information map in a scanning order; and determining whether a current pixel is non-empty according to the placeholder information map, and predicting depth information of a current non-empty pixel by using the reconstructed depth information of encoded non-empty pixels, to obtain the predicted residual.

6. The method according to claim 3, wherein performing prediction on the pixel in the depth information map based on the reconstructed depth information of encoded pixels to obtain the predicted residual comprises:
  performing prediction on the pixel in the depth information map by selecting an optimal prediction mode among a plurality of preset prediction modes to obtain the predicted residual.

7. The method according to claim 6, wherein the plurality of preset prediction modes comprises two or more of:
  direct mode,
  to-the-left prediction mode,
  upward prediction mode,
  upper left prediction mode,
  upper right prediction mode, or
  a mode of use pixels on the left, above, on the upper left, and on the upper right as reference pixels.

8. The method according to claim 3, wherein encoding the predicted residual to obtain the depth information code stream comprises:
  determining whether the predicted residual of the depth information of the pixel is 0, and based on the predicted residual being 0, encoding the predicted residual 0.

9. The method according to claim 8, determining whether the predicted residual of the depth information of the pixel is 0, and based on the predicted residual not being 0:
  determining whether the predicted residual of the depth information of the pixel is 1, based on the predicted residual being 1, encoding the predicted residual 1.

10. A point cloud encoding device, the device comprising:
  a processor; and
  a memory storing instruction that, when executed by the processor, cause the device to perform operations comprising:
    acquiring original point cloud data;
    performing two-dimensional regularization plane projection on the original point cloud data to obtain a two-dimensional projection plane structure;
    obtaining a plurality of pieces of two-dimensional image information according to the two-dimensional projection plane structure, wherein the plurality of pieces of two-dimensional image information comprise a depth information map, and wherein the depth information map represents a distance between a corresponding point of each occupied pixel in the two-dimensional projection plane structure and a coordinate origin; and
    encoding the plurality of pieces of two-dimensional image information to obtain code stream information.

11. The point cloud encoding device according to claim 10, wherein the encoding the plurality of pieces of two-dimensional image information to obtain the code stream information comprises:
  encoding the depth information map to obtain a depth information code stream.

12. The point cloud encoding device according to claim 11, wherein the encoding the depth information map to obtain the depth information code stream comprises:
  performing prediction on a pixel in the depth information map based on a placeholder information map to obtain a predicted residual; or
  performing prediction on a pixel in the depth information map based on reconstructed depth information of encoded pixels to obtain a predicted residual, and encoding the predicted residual to obtain the depth information code stream.

13. The point cloud encoding device according to claim 12, wherein before the encoding the depth information map, the device is caused to perform operations further comprising:
  traversing the depth information map in a preset order, and performing, in a case that a current pixel is an empty pixel, depth information filling on the empty pixel.

14. The point cloud encoding device according to claim 12, wherein the performing prediction on the pixel in the depth information map based on the placeholder information map to obtain the predicted residual comprises:
  traversing pixels in the depth information map in a scanning order; and
  determining whether a current pixel is non-empty according to the placeholder information map, and predicting depth information of a current non-empty pixel by using the reconstructed depth information of encoded non-empty pixels, to obtain the predicted residual.

15. The point cloud encoding device according to claim 12, wherein performing prediction on the pixel in the depth information map based on the reconstructed depth information of encoded pixels to obtain the predicted residual comprises:
  performing prediction on the pixel in the depth information map by selecting an optimal prediction mode among a plurality of preset prediction modes to obtain the predicted residual.

16. The point cloud encoding device according to claim 15, wherein the plurality of preset prediction modes comprises two or more of:
  direct mode,
  to-the-left prediction mode,
  upward prediction mode,
  upper left prediction mode,
  upper right prediction mode, or
  a mode of use pixels on the left, above, on the upper left, and on the upper right as reference pixels.

17. A point cloud decoding method, the method comprising:
  acquiring code stream information;
  decoding the code stream information to obtain parsed data;
  reconstructing a plurality of pieces of two-dimensional image information according to the parsed data, wherein reconstructing the plurality of pieces of two-dimensional image information according to the parsed data comprises reconstructing, according to predicted residuals of a depth information map in the parsed data, a reconstructed depth information map, wherein the reconstructed depth information map represents a distance between a corresponding point of each occupied pixel in a two-dimensional projection plane structure and a coordinate origin;
  obtaining a two-dimensional projection plane structure according to the plurality of pieces of two-dimensional image information; and
  reconstructing a point cloud based on the two-dimensional projection plane structure.

18. The method according to claim 17, wherein decoding the code stream information to obtain the parsed data comprises:
  determining whether the predicted residual of a depth information of a pixel is 0, and based on the predicted residual being 0, the predicted residual of the pixel decoded is 0.

19. The method according to claim 17, wherein decoding the code stream information to obtain the parsed data comprises:
- using a placeholder information map and reconstructed depth information of encoded pixels to perform linear fitting and filling on depth information of a current empty pixel.

20. The method according to claim 17, wherein reconstructing, according to the predicted residuals of the depth information map in the parsed data, the depth information map comprises:
- predicting a predicted value of the depth information of a current pixel to be reconstructed according to a placeholder information map and reconstructed depth information of encoded pixels; and
- reconstructing the depth information of the current pixel according to the predicted value and a predicted residual of the current pixel.

* * * * *